United States Patent
Kashter et al.

(10) Patent No.: US 12,081,730 B2
(45) Date of Patent: Sep. 3, 2024

(54) DYNAMIC PARALLEL MONOCULAR PROJECTION

(71) Applicant: Spectralics Ltd., Tel Aviv (IL)

(72) Inventors: Yuval Kashter, Ramat Gan (IL); Eran Falek, Netanya (IL); Ran Bar-Yosef, Tel-Aviv (IL)

(73) Assignee: Spectralics Ltd., Tel Aviv (IL)

( * ) Notice: Subject to any disclaimer, the term of this patent is extended or adjusted under 35 U.S.C. 154(b) by 0 days.

(21) Appl. No.: 18/591,880

(22) Filed: Feb. 29, 2024

(65) Prior Publication Data

US 2024/0205384 A1 Jun. 20, 2024

Related U.S. Application Data

(63) Continuation of application No. PCT/IL2022/050957, filed on Aug. 31, 2022.

(60) Provisional application No. 63/238,791, filed on Aug. 31, 2021.

(51) Int. Cl.
*H04N 13/383* (2018.01)
*H04N 13/32* (2018.01)

(52) U.S. Cl.
CPC .......... *H04N 13/383* (2018.05); *H04N 13/32* (2018.05)

(58) Field of Classification Search
CPC .............................. H04N 13/32; H04N 13/383
USPC .......................................................... 348/51
See application file for complete search history.

(56) References Cited

U.S. PATENT DOCUMENTS

| | | | |
|---|---|---|---|
| 10,338,400 B2 | 7/2019 | Connor | |
| 10,579,141 B2 | 3/2020 | Aleem et al. | |
| 10,775,633 B1 | 9/2020 | Lee et al. | |
| 10,795,164 B1 | 10/2020 | Chao et al. | |
| 11,838,495 B1* | 12/2023 | Wilburn | H04N 13/366 |
| 2001/0005261 A1* | 6/2001 | Martin | H04N 5/7491 |
| | | | 348/E13.058 |
| 2017/0176744 A1* | 6/2017 | El-Ghoroury | G02B 27/1066 |
| 2018/0084232 A1* | 3/2018 | Belenkii | H04N 9/3105 |
| 2019/0243448 A1* | 8/2019 | Miller | G02B 27/017 |
| 2020/0293108 A1* | 9/2020 | Georgiou | G02B 27/0093 |
| 2021/0181840 A1* | 6/2021 | Vlaskamp | G02B 6/0076 |
| 2022/0260840 A1* | 8/2022 | Kessler | G02B 27/283 |

FOREIGN PATENT DOCUMENTS

WO WO2020/136646 7/2020

OTHER PUBLICATIONS

T. Kozacki, "Holographic display with tilted spatial light modulator," Applied Optics, vol. 50, No. 20 (2011).

(Continued)

*Primary Examiner* — Frantz B Jean
(74) *Attorney, Agent, or Firm* — PEARL COHEN ZEDEK LATZER BARATZ LLP (57) ABSTRACT

A Dynamic Parallel Monocular Projection (DPMP) system for the provision of dynamically adjusted images to a Head Motion Box (HMB) is provided herein. The DPMP may include a picture generation unit (PGU); a projection unit, further comprising a displaying unit and at least one optical modulator, a Multi-Layered Thin Combiner (MLTC), comprising an infra-red (IR) light source and an IR detection sensor, thereby enabling the provision of images adjusted to the individual location of the observer's eyes within the HMB.

9 Claims, 7 Drawing Sheets

(56) References Cited

OTHER PUBLICATIONS

S. A. Goorden, J. Bertolotti, and A. P. Mosk, "Superpixel-based spatial amplitude and phase modulation using a digital micromirror device," Optics express, vol. 22, No. 15 (2014).

* cited by examiner

DYNAMIC PARALLEL MONOCULAR PROJECTION

CROSS REFERENCE TO RELATED APPLICATION

This application is a Continuation Application of PCT Application No. PCT/IL2022/050957 filed Aug. 31, 2022, claiming priority from U.S. Provisional Patent Application No. 63/238,791 filed Aug. 31, 2021, both are incorporated herein by reference in their entirety.

FIELD OF INVENTION

The present invention relates generally to a Dynamic Parallel Monocular Projection (DPMP) system configured to be implemented in Head Up Display systems. The system of the present invention is operable to modulate image channels of a Picture Generation Unit, corresponding with the positions of the observer's eyes, that may comprise a "real world" view overlayed with augmented reality (AR) graphics using an optical combiner, thereby reducing aberrations, distortions and defocusing, etc, arising as a result of the eye parallax.

BACKGROUND OF THE INVENTION

In classical Head Up Display (HUD) systems, the optical arrangement enables the ability to trace light from a Picture Generation Unit (PGU) to a single large exit pupil, named the Head Motion Box (HMB). To provide the observer the ability to acquire an image in both of his/her eyes simultaneously, the HMB size has to be much larger than the average distance between the eyes (denoted by the Interpupillary Distance (IPD)), which is 65 mm for males and 62 mm for females.

Currently, two different approaches for augmented reality (AR) systems are used in HUDs. In the "video see-through" (VST) approach, a camera is used to capture and digitalize the "real world". To the captured and digitalized "real world", overlaying graphics are added to the video signal and the composite real-augmented digital data is displayed on an opaque display. The second approach is commonly referred to as the "optical see-through" (OST) approach. In the OST approach, the observer maintains a physical view of the "real world" through some form of a transparent element, for example, an optical combiner or a window. The view of the "real world" is then further augmented by overlaying graphics directly onto the transparent element between the observer and their "real world" view.

Figure 1:
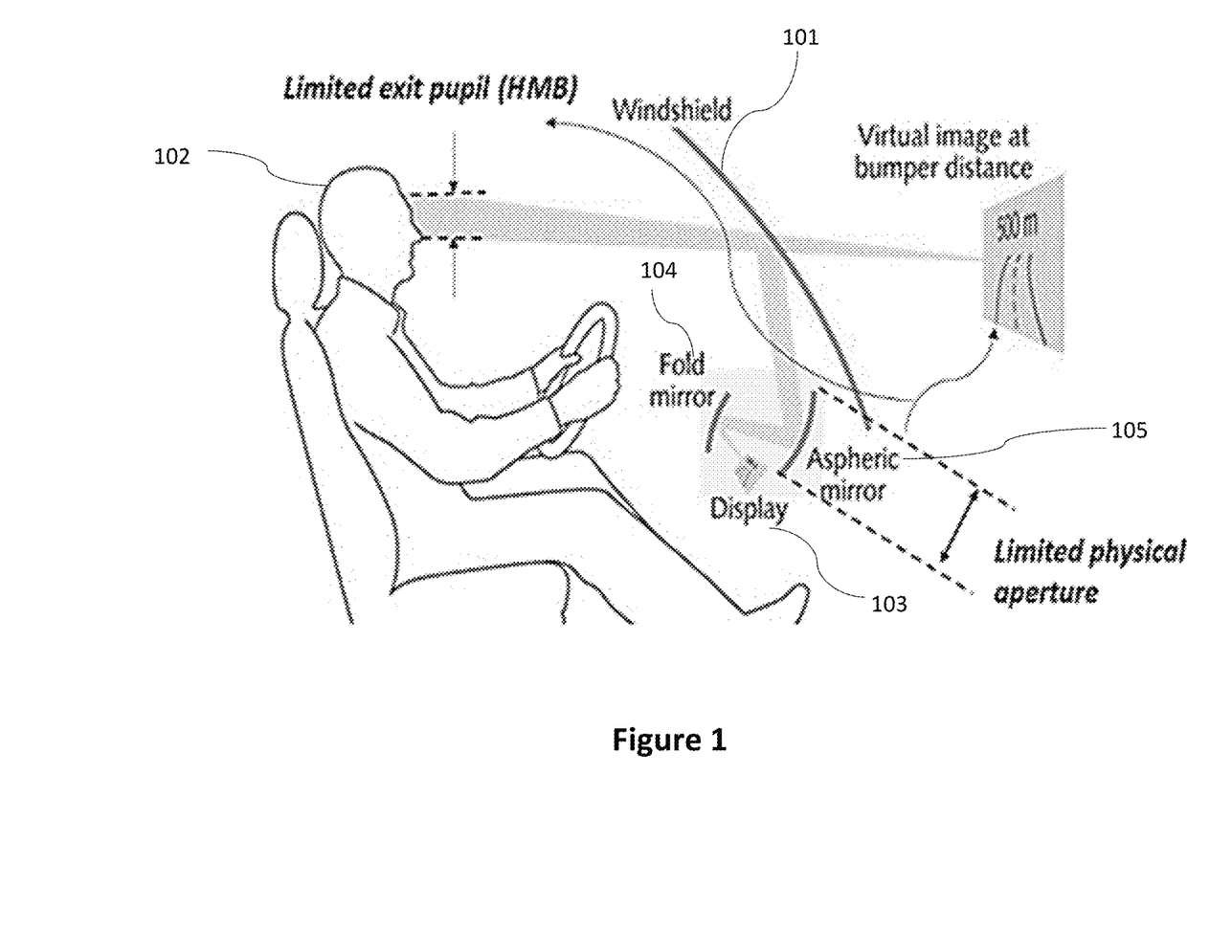
FIG. 1 schematically illustrates a classical HUD system for a car.

A schematic illustration of a vehicle-based windshield HUD is detailed in FIG. 1. AR content that may be projected onto the windshield 101 in front of the driver 102 is emitted by an overlay display device 103. The content is pathed via a fold mirror 104 and an aspheric mirror 105. Then, the incident light is transmitted to the line of sight at an angle, dictated by the windshield tilting angle, relative to the windshield 101 to display a single HMB in the location of the driver's eyes 102.

Since the HMB is dictated by the aperture size of the optical component immediately preceding projection (e.g., aspheric mirror) 105, that might limit the aperture size due to a limited volume of a PGU's enclosure (e.g., the limited volume in the dashboard area requires a compact PGU with limited aperture), the resultant field of display 106 is significantly smaller than that of the scene field of display 107 visible through windshield 101.

Recently, an advanced configuration of a HUD system providing means by which optical power and functionality may be conferred to a large transparent surface (e.g., a windscreen) in such a manner that an optical channel is established between the observer and the system on the internal surface and where transparency of the surface is preserved was presented in WO 2020/136646 [1]. In this concept, an additional thin optical element is integrated into the windshield, named the Multi Layered Thin Combiner (MLTC). The unique structure of the MLTC enables tracing the light to a large HMB, which can support a large Field of View (FOV), relative to an equivalent compact HUD system. By doing so, the optical performance is increased dramatically.

Figure 2:
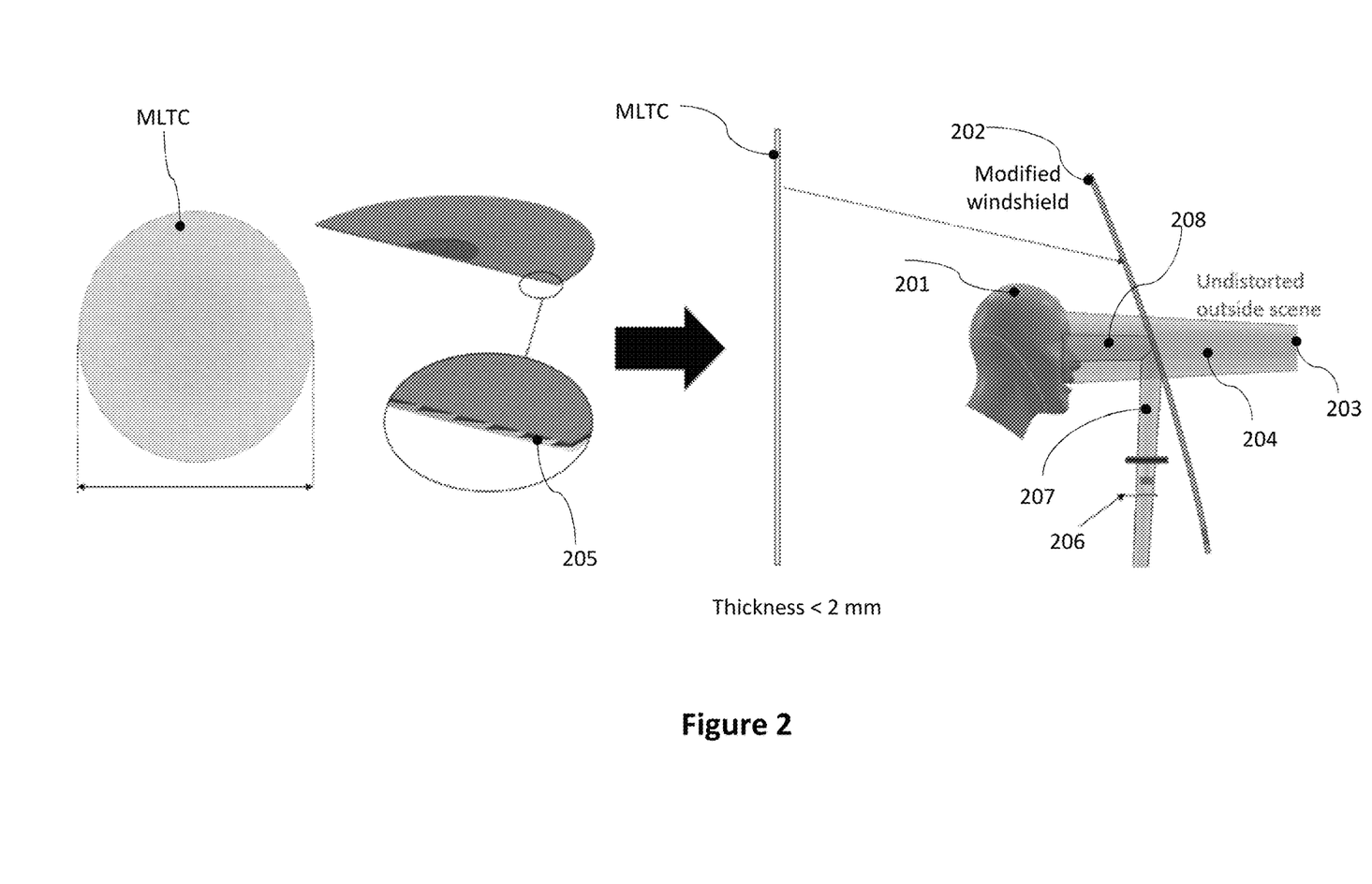
FIG. 2 schematically illustrates the previous concept of a Multi-Layered Thin Combiner (MLTC). A multi layered structure provides the ability to implement a thin element that can be integrated in the windshield 202, expanding the HMB and the FOV, without affecting the outside scene 203.

In FIG. 2, a HUD system powered by the MLTC is presented. The MLTC comprises a plurality of connectable layers each having a separate active area coated with a primary partially reflective filter; wherein each active area comprises a discrete fraction of an effective aperture; and wherein the active areas are configured to align, when said connectable layers are connected, to collectively define a complete effective aperture.

The MLTC comprises 12 layers, e.g., 11 active layers areas/segments and one host element. The host element t1 has a thickness of 2.1 mm and each layer t2 has a thickness of 0.05 mm leading to a total thickness T of 2.8 mm.

The MLTC is engineered to obviate geometrical discontinuities while retaining applicability for integration onto any transparent surface, e.g., a windshield. In an embodiment, the thickness of the MLTC optical combiner is less than 2 mm.

The MLTC may be incorporated into the inner-facing side of a transparent surface 202, e.g., a windshield, facing the observer 201, e.g., a driver or passenger in a car. The MLTC may be configured for adhesion to a transparent surface 202 or may be incorporated inside a transparent surface 202.

One functionality of the MLTC is to permit the transmission of unmodulated light from an undistorted real-world scene 203 to an observer 201. This is achieved since incident light 204 upon the external bounding surface is unaffected by the partially reflective filter 205 (e.g., a notch filter) applied to the active areas in each layer of the MLTC. However, virtual light/data incident 206 upon the internal bounding surface closest to the user is modulated owing to the partially reflective filter and is reflected to the observer. Thus, the unmodulated light 204 from the real-world scene and modulated light 207 from the virtual data light source 207 are combined, aligned, and perceived by the observer as a single composite view 208.

In one way, the MLTC, transmits the light from the real-world 203 through the window, preserving it unaffected (remains unmodulated). On the other hand, it modulates the light from the PGU 206, according to a specific optical design to trace the light 208 to the head motion box, where the observer's eyes 201 are located.

Secondly, the MLTC may further allow the observer 201 to perceive virtual data seamlessly in alignment with the real-world view 203 and may further allow to interact with the modulated reciprocal optical path.

Indeed, the MLTC opens a new realm of possibilities, since it overcomes the barriers dictated by the finiteness of the last optical component in the imaging system.

However, the MLTC is still based on a single HMB that is created in the PGU due to a single channel of traced light directed from various directions. As a result, the FOV perceived at any point in the HMB (i.e. the exit pupil) is dependent from the exact location of an observer's pair of eyes within the HMB. Thus, each eye receives a different shape of image that may be individually modulated by a varied form of aberrations, distortions and defocusing, etc., that relate to the position of an eye of an observer within the HMB.

Figure 3A:
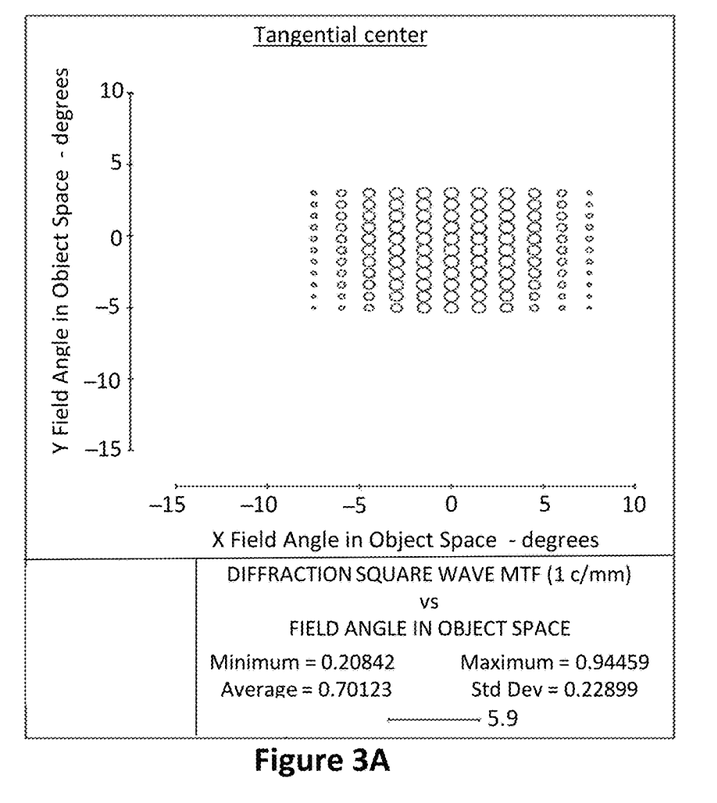
FIGS. 3A-3B schematically illustrate the Modulation Transfer Function which is varied according to the location of a pinhole (approximately 4 mm in diameter, for example) on the HMB plane. The sagittal MTF is relative to approximately 1 cycle/mm, with respect to approximately 18° FOV along the tangential plane.
Figure 3B:
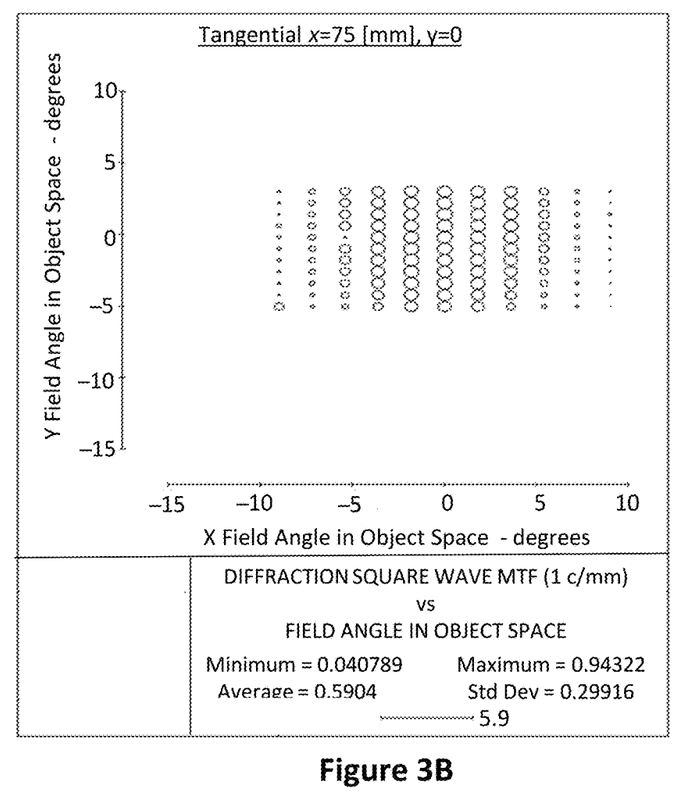

In FIGS. 3A and 3B, the Modulation Transfer Function (i.e., the spatial resolution) is varied according to the location on the HMB plane. In the example shown in FIG. 3A, a pinole that imitates the eye's pupil (4 mm in diameter) is located at the tangential center of the HMB. In FIG. 3B, a pinole imitating the eye's pupil is located at a distance of approximately 75 mm along the horizontal direction of the tangential center. By comparing the distribution of the pinoles for a HMB at the tangential center to the pinole distribution at a tangential shift of approximately 75 mm into horizontal x-direction, it is clearly derivable that the MTF field (represented by the size of the circles) changes its distribution. As can be seen in FIG. 3B, a break in symmetry of the pinole distribution is observed once the eye is shifted from the center. The results, namely the reduced symmetry in the pinole distribution, indicate that shifting the HMB in horizontal direction leads to a parallax between the eyes. Moving the position of an eye away from the tangential center of the HMB, the eye experiences a modulated view of an image compared to an eye at the tangential center of the HMB and thus, the quality of an image that is provided to a pupil that is located off the tangential center may be reduced and may be affected by modulation effects, such as aberrations, distortions and defocusing, etc.

A shift in the FOV of the tangential center may further result in an increase in the angle of the acceptance cone of an objective and ultimately leads to improved light-gathering abilities but a lower resolution of an object in relation to a point in the HMB as detailed in the previous section.

For small changes in FOVs (e.g., FOV~8°) the parallax between the eyes is relatively minor, since the traced light is directed to angles which are close to the initial position of the FOV. Further, the Numerical Aperture (NA) is also relatively small. Therefore, it is much easier to determine the optimal positions and shapes for the optical components, such as the projecting unit and the MLTC, that will allow to furnish an image, e.g. a composite view of real-world view and virtual data, of a reasonable quality to the pupils located in the HMB taking into account the relative position and orientation of the eyes in relation to an image of an object. However, when dealing with HUD systems that provide large FOVs (e.g., FOV~20°), the traced light is directed to angles which are significantly dislocated from the initial position of the FOV. Thus, the determination of the optimal positions and shapes for the optical components furnishing an image in a reasonable quality to each of the observer's eyes becomes significantly challenging.

To this date, the only way to increase the quality of the pupil, and account for the parallax of the observer's eyes, is based on a complicated optical design that consists of many optical components with large apertures. As a result, the optical system will be expensive, heavy, and will occupy a large volume which may render the system irrelevant, particularly in civilian applications.

Herein, a new approach for a parallax-free HUD concept referred to as a Dynamic Parallel Monocular Projection (DPMP) is detailed. The DPMP produces high quality images that are furnished to the observer's eyes regardless of the location in the FOV and its overall size.

In the present invention, the DPMP enables the allocation of two exit pupils and two imagining channels that individually correspond to the location of each of the eyes.

Instead of the provision of one exit pupil, leading to large NAs for large deviations of the HMB from the tangential center, the present invention comprises two exit pupils and two channels that provide images to the HMB leading to narrow NAs even for large deviations from the tangential center. Thus, as previously mentioned herein, modulation effects, such as aberrations correction and volume requirements, as well as the number of optical components is significantly reduced for a narrow range in the NA. Additionally, the system can dynamically reshape the field distribution (amplitude and phase) of each channel. As a result, two images with two corresponding exit pupils can be adapted to the exact location of the eye, its line of sight, and the form of the image that is created.

SUMMARY OF THE INVENTION

The present invention provides a Dynamic Parallel Monocular Projection (DPMP) system for the provision of dynamically adjusted images to a Head Motion Box (HMB), the system comprising: a picture generation unit (PGU) providing images to a projection unit, the projection unit further comprising a displaying unit and at least one optical modulator, wherein the at least one optical modulator is configured to dynamically and individually modulate images for each of two exit pupils in amplitude and phase distribution corresponding to the position of the observer's eyes located within the Head Motion Box (HMB); and a Multi-Layered Thin Combiner (MLTC), comprising an infra-red (IR) light source and an IR detection sensor, wherein the MLTC is configured to trace IR light from the IR light source to the HMB; and wherein the MLTC is configured to acquire reflections of IR light from the observer's eyes using the IR detection sensor, thereby locating the position of the observer's eyes within the HMB in relation to the projection unit; thereby enabling the provision of images adjusted to the individual location of the observer's eyes in the HMB.

In an embodiment, the images provided to the observer's eyes are parallax-free.

In an embodiment, the position of each of the observer's eyes is localized by detecting the IR light that is reflected from the retina of the observer's eyes by the IR detection sensor.

In an embodiment, a threshold is applied to the intensity distribution of the IR light detected by the IR detection sensor to only isolate the retina reflections of the observer's eyes.

In an embodiment, the observer's eyes are located within the entire region of the HMB.

In an embodiment, the two exit pupils are located in symmetrical manner relative to the optical axis of a pair of observer's eyes located in the HMB.

In an embodiment, the phase modulator is (i) an LCOS based Spatial Light Modulator (SLM) or (ii) a Digital Micromirror Device (DMD).

In an embodiment, the IR detection sensor contains Indium Gallium Arsenide alloys (InGaAs).

In an embodiment, the DPMP system is configured to be implemented in a Head Up Display (HUD).

BRIEF DESCRIPTION OF THE DRAWINGS

In FIG. 3A the pinhole is located at the center of the HMB. In FIG. 3B the pinhole is located at a distance of approximately 75 mm along the horizontal direction.

FIGS. 4A-4B schematically illustrate an optical scheme of an MLTC based HUD system with a projecting unit. FIG. 4A discloses an isometric illustration of a schematic configuration that comprises a lens arrangement in the projecting unit represented by 401/L1 and the MLTC represented by L2. FIG. 4B discloses a schematic configuration of a thin lens representation. Both eyes 402 and 403 are captured by the HMB that is emitted from a central point of the PGU unit at the object plane.

FIGS. 5A-5B are schematic configurations of the DPMP concept, according to an embodiment of the present invention. The DPMP enables the provision of two exit pupils that are created in correspondence to the location of the eyes 502a and 502b within the entire HMB region. In FIG. 5A, the eyes are located in a symmetrical manner relative to the optical axis. In FIG. 5B, the eyes are shifted to a peripheral area, relative to the optical axis. Rays 503a and 503b represent two segments of numerical aperture (NA), corresponding with the two above-mentioned exit pupils (located according to the locations of the eyes), that are emitted from the object, wherein rays 504a and 504b represent the entire numerical aperture (NA) that can be supported by the optical arrangement of the DPMP (due to the involvement of the MLTC).

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units may be at least partially implemented by a computer processor.

The following term definitions are provided to aid in construal and interpretation of the invention.

The terms "combiner" or "optical combiner" refer generally to an optical device configured to merge two or more light beams into a single, possibly unified, light beam. In the present context, a combiner may be employed to merge a virtual image, possibly originating from a data overlay device, with a real-world image (i.e., light originating from a scene/environment) such that virtual data is perceived (e.g., by a user) to be aligned, possibly conformally, with features within the real-world.

The term "active area" refers generally to the portion and/or fraction of an item/article which fulfils an optical function when utilized. In the present context, an active area may refer to the portion of a layer in a MLTC which has been modified (e.g., as a result of a partially reflective filter coating) to perform, alone or in combination with other layers, an optical function (e.g., polarization, reflection, modulation, or the like). An active area is typically formed as a continuous undistributed shape, for example in the form of a circular or elliptical ring, and may align with other active areas in other layers to collectively form a composite aperture/interface. The term "effective aperture" refers generally to the total area/sum of areas through which electromagnetic radiation (e.g., light) may travel. In the present context, the effective aperture is created by the composite of, for example, circular/elliptical sub apertures that are arranged in the form of a multilayered structure. The size of the effective aperture and the focal length of an optical system may collectively dictate the cone angle of rays focused on the image plane of that optical system (also known as "Numerical Aperture" or NA of the system).

Figure 4A:
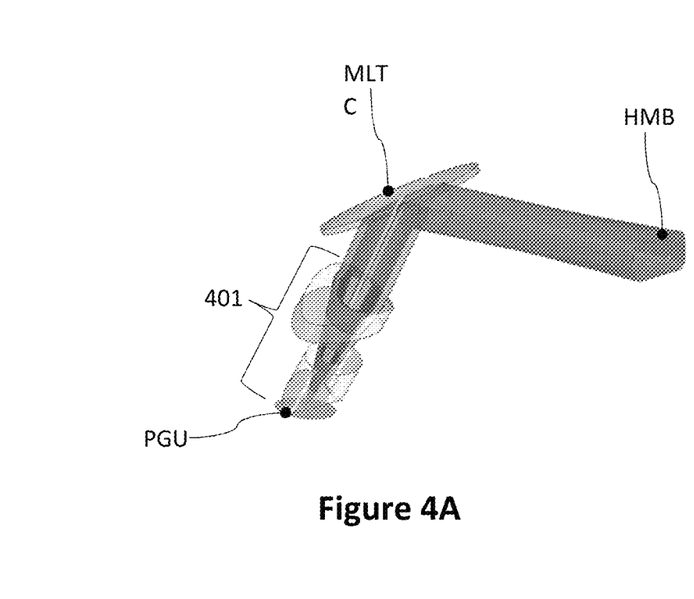

In FIG. 4A, a state-of-the-art schematic configuration of a HUD system comprising a projection unit 401 and an MLTC is disclosed. In this system, a mutual HMB is created including a single exit pupil for both eyes of an observer.

Figure 4B:
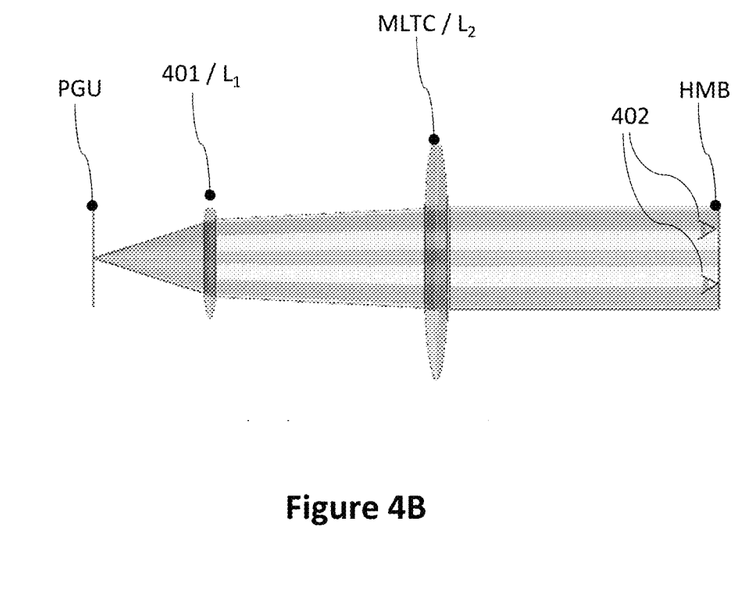

In FIG. 4B, an isometric illustration of the schematic configuration of FIG. 4A is given by a thin lens representation. Lens L1 represents an arrangement of lenses (or mirror with optical power) in the projecting unit 401, which consists of a displaying unit (e.g. an illuminated DLP). Lens, L2 represents the MLTC that provides optical power to the windshield. Both observer's eyes 402 are located within the HMB and receive light that is emitted from a PGU.

As detailed earlier, the unique structure of the MLTC enables tracing the light to a large HMB and, thus, enables to capture a large Field of View (FOV), relative to an equivalent HUD system.

However, the larger the captured FOV, the more difficult it is to trace the light that is emitted to the HMB in order to furnish high quality images to the observer's eyes 402. Due to a large FOV and a large HMB, light that is travelling in the direction of the HMB may reach the observer's eyes 402 in a broad range of angles.

Referring to FIG. 4B, one can deduce that light, that intersects at the HMB plane, is emitted from many point sources along the object plane of the PGU and reaches the HMB plane in various angles. Each point source within the object plane of the PGU has a specific Numerical Aperture (NA), which is defined by the aperture and the focal distance of the projection unit L1 and the MLTC. As a result, regardless of the quality of the optical elements and other image correction tools, e.g., digital image corrections, supporting a system comprising a HMB in combination with a large FOV is extremely difficult.

Figure 5A:
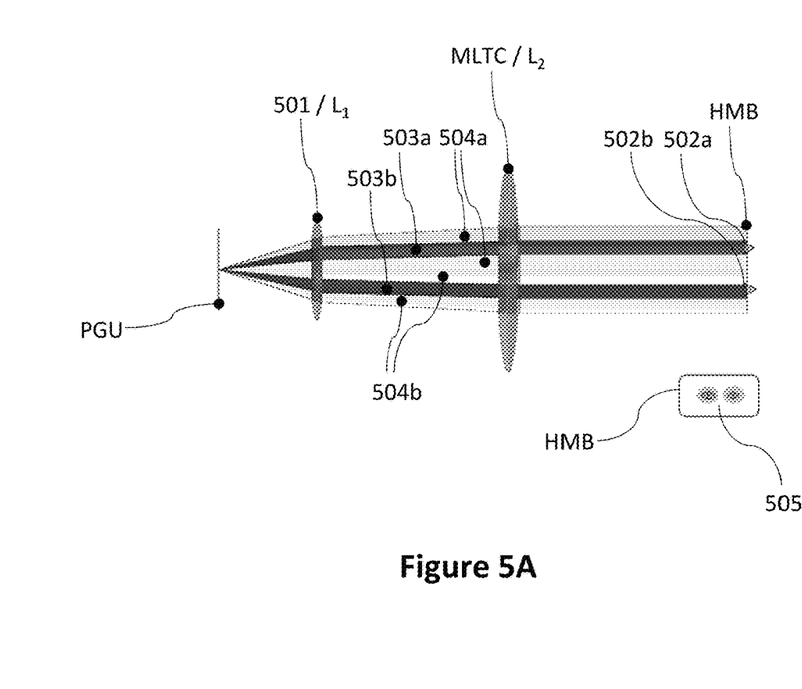
Figure 5B:
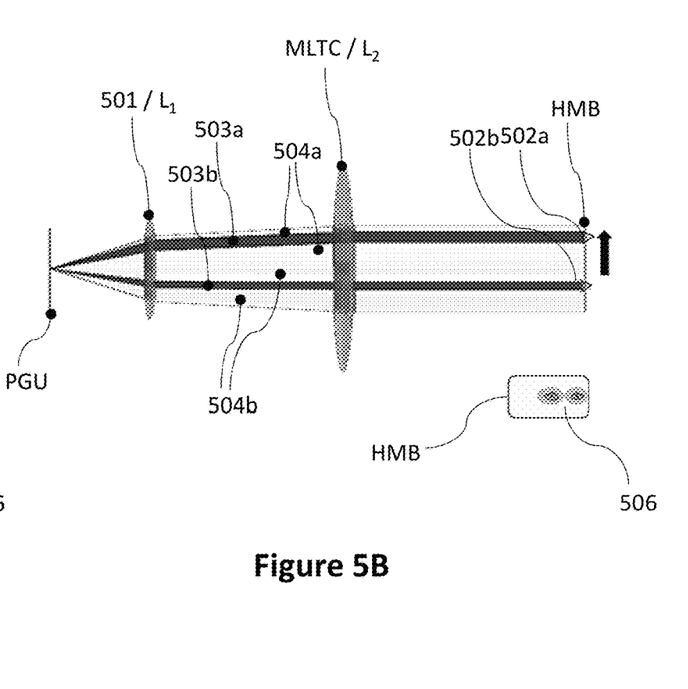

In the schematical illustrations presented in FIGS. 5A and 5B, an optical scheme of the DPMP concept of the present invention is shown.

As detailed in FIG. 5A, the DPMP system comprises a projection unit that leads to the generation of two exit pupils within the HMB. Each of the two exit pupils may be allocated to the location of one of the observer's eyes 502a and 502b in the entire HMB region. Referring to the example provided in FIG. 5A, the observer's eyes 502a and 502b are located in a symmetrical manner relative to the optical axis. The projection unit emits light via image channels 503a and 503b. Image channel 503a emits light in respect to the location of observer eye 502a and image channel 503b emits light in respect to the location of observer eye 502b. The position of the observer's eyes in FIG. 5A corresponds to the case in which the pair of eyes 502a and 502b is located in a central area 505 within the HMB. However, due to head movements of the observer, the position of the eyes 502a and 502b may shift to a peripheral area 506 within the HMB as detailed in FIG. 5B.

In FIG. 5B, an eye shift to a peripheral area, relative to the optical axis is detailed. Rays of image channel 503a and 503b represent the light that is emitted from the projection unit, wherein areas 504a and 504b represent the entire NA that can be supported by the optical arrangement. Specifically, area 504a represents the entire NA that can be supported by the optical arrangement for eye 502a and area 504b represents the entire NA that can be supported by the optical arrangement for eye 502b.

Existence of an MLTC to Trace the Light to the HMB Plane

As mentioned before, the projection unit emits light in form of two image channels passing the MLTC. The image channels meet the HMB within two small regions inside the entire region of the HMB corresponding to the location of the eyes within the HMB. Although in every moment only two fractions of the exit pupils are created, the requirement to trace the light to the entire HMB region remains. Consequently, as part of the DPMP concept, the existence of the MLTC is crucial, since the aperture size of the MLTC defines potential positions for the eyes within the HMB plane for which the eyes can receive virtual images.

Feedback System by Eyes Acquisition

The allocation of two fractions of the entire HMB region to represent the exit pupils requires the provision of a precise location (in the scale of millimeters) of the eyes within the HMB region. The MLTC enables to trace the direction of light that has been emitted by the MLTC as well as the direction and source of light that has been received by the MLTC. Thus, the MLTC can be used as an active feedback system that enables the location of the eyes within the HMB:

The MLTC may be illuminated by an IR LED (LED array) that emits light in the direction of the HMB. The MLTC may be configured to trace the light, e.g. light emitted by an IR LED within the entire HMB area. The MLTC may further be configured to detect reflections of the emitted IR LED light by an IR detecting sensor located within the MLTC. A reflection of the IR LED light may be a result of the reflection of light by the retina of an eye. The detection of the reflection of the retina-reflected light by the sensor located within the MLTC may be used to the localize the position of the observer's eyes within the HMB area.

Figure 6:
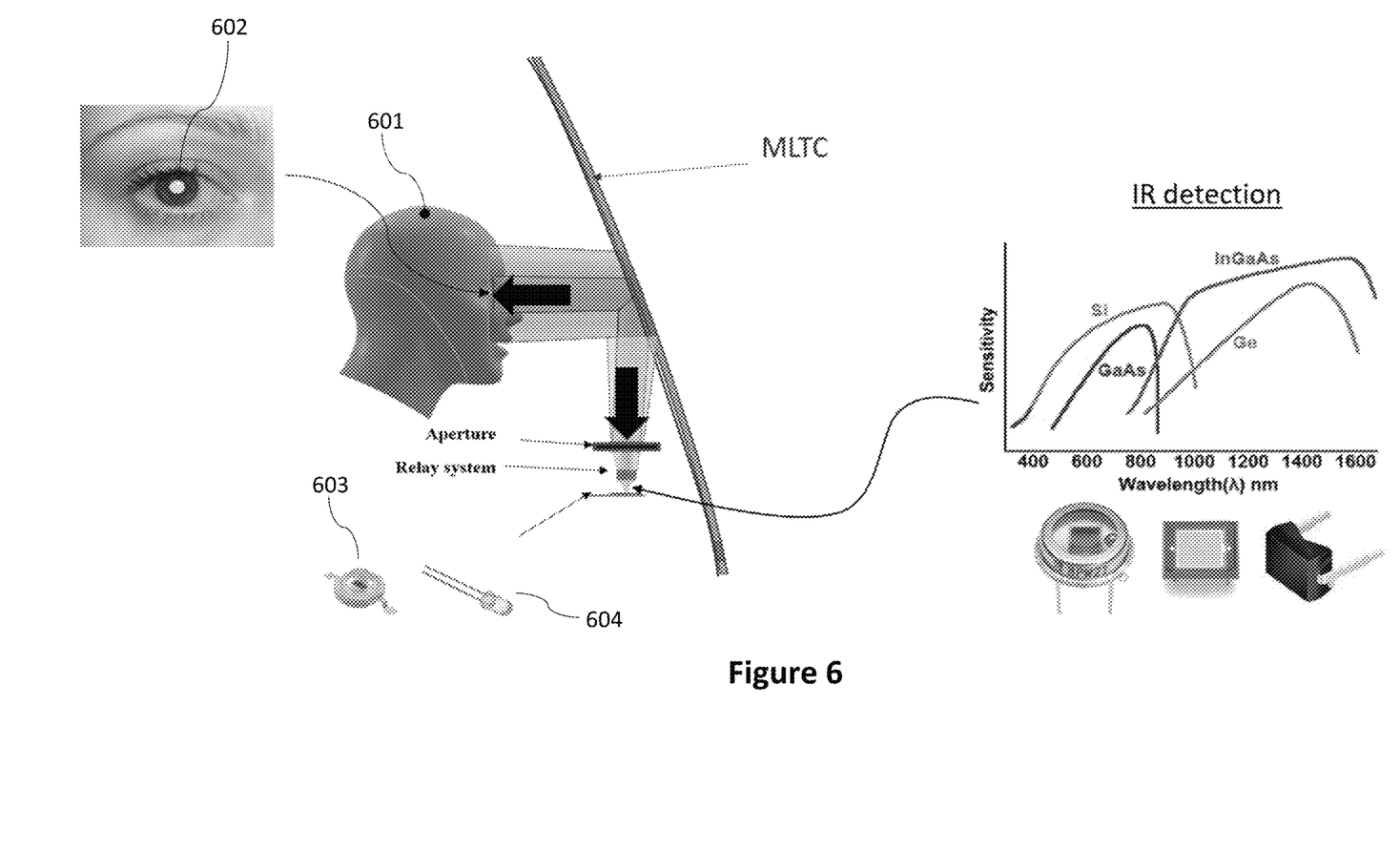
FIG. 6 details an active feedback system that is based on the MLTC, in accordance with an embodiment of the present invention. The MLTC is illuminated by an IR LED (LED array) 603, in accordance with an embodiment of the present invention. The MLTC traces IR light to the entire HMB area. Reflections resulting from the retina of the eyes of an observer 601 are acquired by an array of IR sensors 604, according to an embodiment of the present invention.

In FIG. 6, an MLTC based active feedback system for the localization of the eyes of an observer 601 within the HMB area is described. The observer may be the driver or passenger of a vehicle, for example, a car. The MLTC (i.e., a giant lens in front of the observer) located at the inner surface of the windshield is configured to trace the light that is emitted from a HUD system, but also to trace the light that has been reflected from the observer's eyes in the direction of the MLTC in a reciprocal manner. As detailed before, an IR LED (or IR LEDs array) 603 may be implemented within the MLTC to illuminate the entire HMB in order to create a reflection of the observer's eyes retina 602. The reflection of the light by the retina 602 leads to the provision of a strong reflected light beam (named the retro effect) that characterizes a small area locating the retina 602 of one or both observer's eyes. The use of an IR LED 603 may allow to enhance the intensities of the retina reflection of the observer's eyes in the acquired image of the HMB by an IR detection sensor 604 relative to the surrounding area and highlights their positions within the HMB. Next, the intensity distribution from the HMB is being acquired by an array of IR detection sensors, such as Indium Gallium Arsenide (InGaAs based detection sensor).

Finally, using algorithms and numerical tools, the location of the eyes can be isolated (e.g. applying a threshold on the intensity distribution to isolate only the two retro illuminations) and the exact position of the observer's eyes within the HMB can be determined.

Unlike digital cameras (e.g., CMOS camera), the array of IR detection sensors only detects reflected IR light from the observer's pupils. No multispectral image of the observer's pupils that may enable the observer's identity is detected. Additionally, the frequency of detection of IR light by the IR detection sensor is faster than the detection of light by a digital camera and may be in the scale of nano seconds.

Dynamic Phase Modulation of Each Image Channel in Real-Time

In order to generate a parallax-free image to an observer's pair of eyes, the light wavefront of each image channel should be adjusted with respect to the lateral location of the observer's eyes in the HMB plane. Moreover, the specific solid angle that is emitted in the PGU (i.e., location and size of a generated image in the entire FOV) might also be taken into consideration. Each channel has its own optimal amplitude and phase distribution that can be manipulated dynamically, corresponding to the locations of the observer's eyes and the generated image. Therefore, it is important to implement a dynamic phase and amplitude modulation in the DPMP system. The dynamic phase and amplitude modulation may enable the individual modulation of each one of the image channels.

Figure 7A:
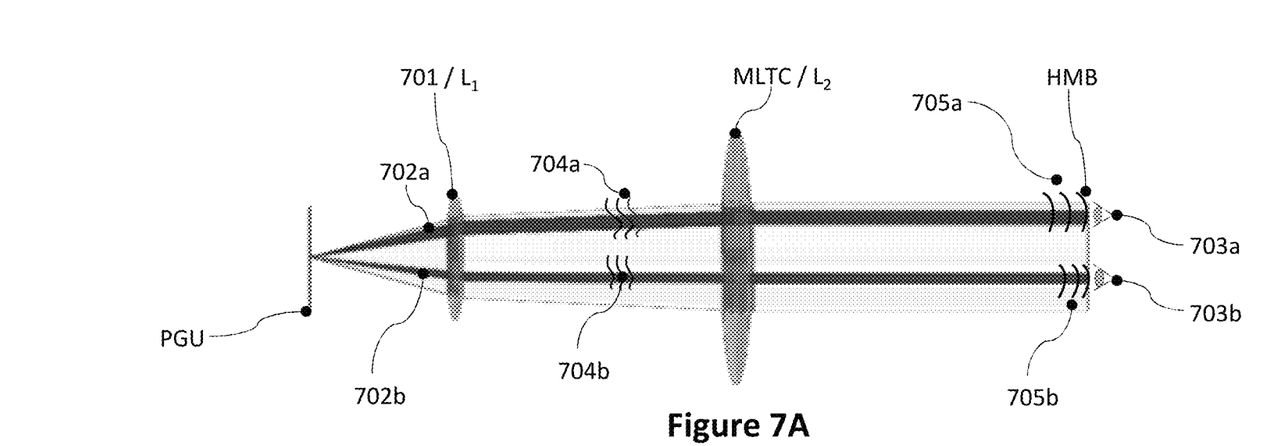
FIG. 7A schematically illustrates the dynamic phase modulation for each channel with respect to its location in the HMB, according to an embodiment of the present invention.

In the optical scheme, presented in FIG. 7A, the phase modulation of each of the two image channels 702a and 702b of the DPMD system with respect to the location of the observer's eyes 703a and 703b in the HMB is disclosed. The two image channels 702a and 702b created by the modulation unit are individually modulated based on the position of the observer's eyes 703a and 703b in the HMB and their orientation dictated by the location of the image in the FOV. For example, in FIG. 7A, the position of the two eyes 703a and 703b within the HMB is different from each other. Eye 703a is located in a peripheral area within the HMB at the upper end of the HMB. In contrast, eye 703b is located slightly below the middle of the HMB plane. Thus, the retina of eye 703a is tilted represented by element 705a. Therefore, the resulting light wavefront of image channel 702a, directed to eye 703a is modulated by the first modulator of the projection unit 701. The modulated wavefront 704a of image channel 702a has been dynamically adjusted, e.g., in amplitude and phase, in response to the position of the retina of eye 703a.

By contrast, the retina of eye 703b is only slightly tilted represented by element 705b. Thus, the resulting light wavefront of image channel 702b, directed to eye 703b is modulated by the second modulator of the projection unit 701. The modulated wavefront 704b of image channel 702b has been dynamically adjusted, e.g., in amplitude and phase, in response to the position of the retina of eye 703b.

Figure 7B:
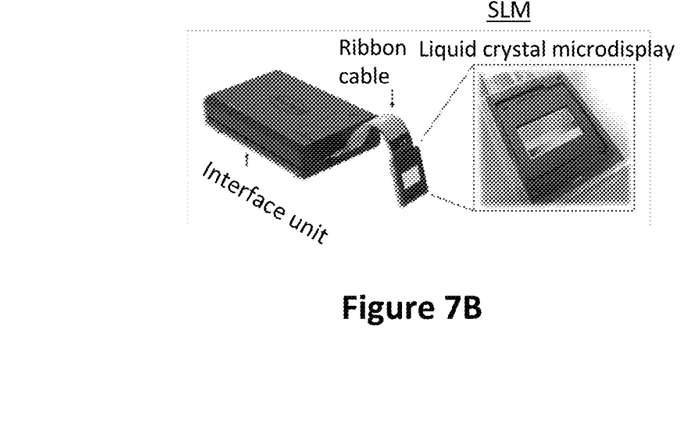
FIG. 7B shows a Holoeye Pluto SLM device and FIG. 7C shows a Texas instrument DMD, both of which may be used as modulators in the DPMP system of the present invention.
Figure 7C:
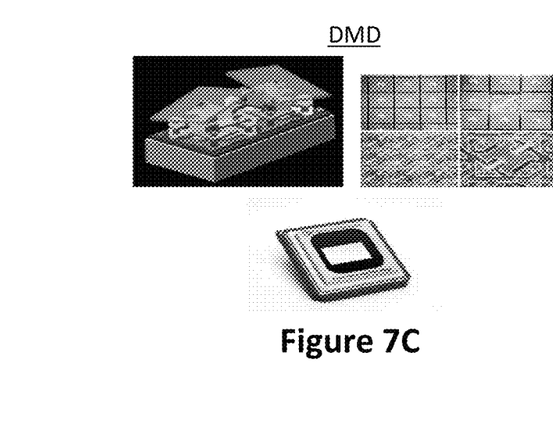

Currently, there are two state of the art devices that can be used as a phase modulator: A LCOS based Spatial Light Modulator (SLM) [2], that is commonly used in digital holography as disclosed in FIG. 7B. Alternatively, a Digital Micromirror Device (DMD) [3], may be used as a modulator in the phase modulation for each channel as detailed in FIG. 7C.

To reduce the number of optical hardware elements in the system the optical arrangement can support both the image projection and the acquisition system. Additionally, a single SLM may be used (instead of two SLMs) by alternating the two above mentioned modulated wavefronts 704a and 704b to implement two corresponding modulated exit pupils. This arrangement will be alternated faster than the refresh rate of the eye (i.e., higher than 40 frames per second, for example).

REFERENCES

[1] Y. Kashter, E. Falek, and R. A. Bar-Yosef, "MULTI-LAYERED THIN COMBINER", WO2020136646.
[2] T. Kozacki, "Holographic display with tilted spatial light modulator," Applied Optics, Vol. 5o, No. 20 (2011).
[3] S. A. Goorden, J. Bertolotti, and A. P. Mosk, "Superpixel-based spatial amplitude and phase modulation using a digital micromirror device," Optics express, Vol. 22, No. 15 (2014).

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention.

The invention claimed is:

1. A Dynamic Parallel Monocular Projection (DPMP) system for the provision of dynamically adjusted images to a Head Motion Box (HMB), the system comprising:
    a picture generation unit (PGU) providing images to a projection unit, the projection unit further comprising a displaying unit and at least one optical modulator
        wherein the at least one optical modulator is configured to dynamically and individually modulate images for each of two exit pupils in amplitude and phase distribution corresponding to the position of the observer's eyes located within the Head Motion Box (HMB); and
    a Multi-Layered Thin Combiner (MLTC), comprising an infra-red (IR) light source and an IR detection sensor,
        wherein the MLTC is configured to trace IR light from the IR light source to the HMB; and
        wherein the MLTC is configured to acquire reflections of IR light from the observer's eyes using the IR detection sensor, thereby locating the position of the observer's eyes within the HMB in relation to the projection unit;
    thereby enabling the provision of images adjusted to the individual location of the observer's eyes in the HMB.

2. The DPMP system according to claim 1, wherein the images provided to the observer's eyes is parallax-free.

3. The DPMP system according to claim 1, wherein the position of each of the observer's eyes is localized by detecting the IR light that is reflected from the retina of the observer's eyes by the IR detection sensor.

4. The DPMP system according to claim 3, wherein a threshold is applied to the intensity distribution of the IR light detected by the IR detection sensor to only isolate the retina reflections of the observer's eyes.

5. The DPMP system according to claim 1, wherein the observer's eyes are located within the entire region of the HMB.

6. The DPMP system according to claim 1, wherein the two exit pupils are located in symmetrical manner relative to the optical axis of a pair of observer's eyes located in the HMB.

7. The DPMP system according to claim 1, wherein the phase modulator is (i) an LCOS based Spatial Light Modulator (SLM) or (ii) a Digital Micromirror Device (DMD).

8. The DPMP system according to claim 1, wherein the IR detection sensor contains Indium Gallium Arsenide alloys (InGaAs).

9. The DPMP system according to claim 1, wherein the DPMP system is configured to be implemented in a Head Up Display (HUD).

* * * * *